United States Patent Office 3,631,030
Patented Dec. 28, 1971

3,631,030
PRODUCTION OF ε-CAPROLACTAM
Karl-Siegfried Brenner, Ludwigshafen, Germany, assignor to Badische Anilin- & Soda-Fabrik Aktiengesellschaft, Ludwigshafen (Rhine), Germany
No Drawing. Filed Jan. 6, 1970, Ser. No. 1,037
Claims priority, application Germany, Jan. 18, 1969,
P 19 02 458.9
Int. Cl. C07d 41/06
U.S. Cl. 260—239.3 A                5 Claims

ABSTRACT OF THE DISCLOSURE

Production of caprolactam by catalytic rearrangement of cyclohexanone oxime in the vapor phase in contact with boric oxide catalysts on alumina which contain from 0.1 to 10% by weight of manganese, nickel and/or cobalt or as the salts oxides of such metals. Caprolactam is useful for the production of nylon 6 which is a fiber intermediate.

The invention relates to the production of caprolactam by rearrangement of cyclohexanone oxime in the gas phase.

It is known from French patent specification No. 1,547,240 that lactams can be obtained in high yields by catalytic rearrangement of cycloalkanone oximes in the gas phase in contact with catalysts containing boric acid, when a sulfate, sulfite or phosphate of an element of main group 2 of the Periodic System is added. The high yields specified in the said specification are achieved only at relatively low space velocities, i.e. low space-time yields.

It is an object of the invention to provide a process for the production of caprolactam by rearrangement of cyclohexanone oxime in the gas phase using high space velocities. It is another object of the invention to provide such a process which gives a high space-time yield. These and other objects will be better understood from the following detailed specification.

We have found that ε-caprolactam can be obtained very advantageously by catalytic rearrangement of cyclohexanone oxime in the gas phase at from 250° to 400° C. in contact with an aluminum oxide catalyst containing 10 to 50% by weight of boron oxide, by using a catalyst which contains in addition from 0.1 to 10% by weight (with reference to the whole catalyst) of manganese, nickel and/or cobalt, or as the salts oxides of these metals.

When catalysts modified in accordance with this invention are used, high yields of caprolactam are obtained even at high space velocities; in other words a considerable improvement in the space-time yield is achieved.

Conditions for rearrangements are known. The cyclohexanone oxime may be passed either in vaporous, liquid or solid form over or onto the catalyst which is at the reaction temperature. Rearrangement is carried out at from 250° to 400° C., preferably from 270° to 370° C. The process may be carried out at atmospheric pressure, at subatmospheric pressure or at slight superatmospheric pressure. When the process is carried out at subatmospheric pressure, the pressure range of 20 to 200 mm. is preferred. When the process is carried out at superatmospheric pressure, pressures of more than 2 atmospheres gauge are not generally used.

The process may be carried out in the presence of inert gas, for example carbon dioxide, argon, nitrogen or steam. This embodiment is particularly applicable when using a fluidised bed because then the catalyst may be fluidised by the inert gas which is advantageously preheated. The use of steam has proved to be particularly suitable. For this reason it is also advantageous to start with a cyclohexanone oxime which from its production has a certain water content, for example of from about 1 to 10% by weight.

Generally about 5 to 70% by volume of inert gas may be added (with reference to the gas mixture) depending on whether the process is carried out at atmospheric or superatmospheric pressure or at subatmospheric pressure, more inert gas being used at higher pressure.

The catalysts used for the process may be prepared by conventional methods. For example aluminum oxide in various modifications such as alumina, bayerite or corundum may be impregnated with boron oxide or boric acid, the ratio of boric acid (calculated as boron oxide) to aluminum oxide being from 1:9 to 1:1 by weight. In the catalysts which it is preferred to use, the proportion of boric acid (calculated as boron oxide) is from 25 to 50% by weight. Aqueous solutions of manganese, cobalt or nickel salts are added to these catalysts, either at the start during the application of boric acid or boron oxide or preferably subsequently, so that the metals are applied in an amount of from 0.1 to 10% by weight. It is preferred to use solutions of the nitrates but other soluble salts, for example acetates, sulfates or formates may be used. The catalysts are dried at about 50° to 200° C. and then calcined at 600° to 850° C. to convert the applied salts into the metal oxide mixed phase $Al_2O_3/B_2O_3$. Shaping the catalysts is done by a conventional method, for example by making the catalyst and carrier into a paste with a little water, mixing in a kneader, pressing the mixture into pellets, drying and calcining at the said temperature.

Catalysts having the form of pellets, cylinders or strands or having other geometrical shapes may be used depending on the catalyst arrangement. In the case of stationary catalysts, either particles having a diameter of from 1 to 5 mm. or tubes or network coated with catalyst may be used. It is preferred however to use the catalyst in fragmentary form as a fluidised catalyst. In this case it is advantageous to use catalyst particles having diameters of from 0.005 to 1.5 mm., particularly of from 0.2 to 1.0 mm.

The depth of the catalyst bed is advantageously chosen so that the residence time of the oxime in contact with the catalyst bed is from 0.01 to 20 seconds, preferably from 0.1 to 3 seconds.

It is an advantage of the process that the catalyst can be used at a high space velocity, for example with 1 part by weight of cyclohexanone oxime per part by weight of the catalyst per hour. Higher velocities, for example of up to 4 parts of cyclohexanone oxime per part of catalyst per hour are however possible. The catalysts become exhausted after some time and have to be regenerated, for example by being heated in a stream of air at 700° to 900° C. When a stationary bed catalyst or a catalyst in a fluidised bed is used it is therefore necessary to interpose a regeneration period from time to time. It may therefore be advantageous to use a fluidised flow method by continuously adding fresh or regenerated catalyst and allowing such an amount of catalyst to be removed from the reaction chamber with the vapors as it is desired to pass to separate regeneration.

The lactam prepared by the process according to the invention has a very high purity.

The following examples illustrate the invention. The parts specified in the following examples are by weight.

EXAMPLE 1

500 g. of a catalyst (consisting of boric acid on aluminum oxide and having the composition: 52% of $Al_2O_3$, 45% of $B_2O_3$, and 3% of water) is impregnated with a solution of 50 g. of manganese nitrate ($Mn(NO_3)_2 \cdot 6H_2O$) in 550 g. of water. The catalyst is dried at a temperature of from 60° to 100° C. and then calcined for three hours at 800° C. It is screened into particles of from 0.3 to 1.0 mm. diameter. The catalyst has the following composition: 51.8% of $Al_2O_3$, 44.0% of $B_2O_3$, 2.1% of Mn and 2.1% of $H_2O$.

150 g. of the catalyst described above is brought to a reaction temperature of 350° C.±3° C. in a vertical tube having a length of 60 cm. and a diameter of 60 mm. which is electrically heated and fitted with a glass filter. 310 g. of cyclohexanone oxime having a water content of 3.5% is passed in gas phase over the catalyst within sixty minutes. A pressure of 110 mm. is maintained in the catalyst chamber. The vapor leaving the reaction chamber is condensed in a condenser fed with water at 70° C. The reaction product obtained is distilled at subatmospheric pressure. 285 g. of pure caprolactam is obtained which according to gas chromatographic analysis contains at least 99.8% of caprolactam. This is a yield of 95.0%. The space velocity is 2.05 g. of cyclohexanone oxime per gram of catalyst per hour.

EXAMPLE 2

12.15 kg. of oxime having a water content of 4.1% is passed in the course of 1.03 minutes over 6.1 kg. of a catalyst having the composition: 39.9% by weight of $B_2O_3$, 41.9% by weight of $Al_2O_3$, 1.6% by weight of Ni and 16.6% by weight of water in an apparatus of analogous construction to that in Example 1. A pressure of 800 to 850 mm. is maintained in the reaction chamber. The temperature of the catalyst is kept at 350° to 360° C. The crude caprolatam is distilled. 10.8 kg. of pure ε-caprolactam is obtained, equivalent to a yield of 92.5%, at a space velocity of 1.15 parts per part of catalyst per hour.

EXAMPLE 3

In a manner analogous to that in Example 2, 12.32 kg. is rearranged in the course of 106 minutes. The catalyst of cyclohexanone oxime having a water content of 7% has the composition: 48.1% by weight of $Al_2O_3$, 42.2% by weight of $B_2O_3$, 2.0% by weight of Mn and 7.7% by weight of $H_2O$. The amount used is 6.1 kg. The crude caprolactam obtained is distilled. 10.65 kg. of pure ε-caprolactam is obtained (equivalent to a yield of 93%) at a space velocity of 1.14 parts of cyclohexanone oxime per part of catalyst per hour.

EXAMPLE 4

12.0 kg. of cyclohexanone oxime having a water content of 3.8% is rearranged in the course of 130 minutes in a manner analogous to that in Example 2 in contact with 4.4 kg. of a catalyst having the composition: 49.3% of $Al_2O_3$, 45.4% of $B_2O_3$, 2.4% of Co and 2.9% of water. Nitrogen having a content of 10.5% of ethylene is used for dilution. The crude caprolactam is distilled. 10.65 kg. of pure ε-caprolactam (equivalent to a yield of 92.15%) is obtained at a space velocity of 1.26 parts by cyclohexanone oxime per part of catalyst per hour.

We claim.

1. A process for the production of ε-caprolactam by contacting cyclohexanone oxime in the gas phase at 250° to 400° C. with a catalyst consisting of 10 to 50% by weight of boric acid calculated as boron oxide, 0.1 to 10% by weight of an additive selected from the group consisting of the salts and oxides of manganese, nickel and cobalt and mixture thereof, and with the balance by weight of the catalyst being aluminum oxide.

2. A process as claimed in claim 1 wherein the ratio by weight of cyclohexanone oxime to catalyst is from 1:1 to 4:1.

3. A process as claimed in claim 1 wherein an inert gas is passed over the catalyst together with the cyclohexanone oxime.

4. A process as claimed in claim 3 in which the inert gas is steam.

5. A process as claimed in claim 1 in which cyclohexanone oxime is used which contains from 1 to 10% by weight of water.

References Cited

UNITED STATES PATENTS

| 3,154,539 | 10/1964 | Irnich | 260—239.3 |
| 3,210,338 | 10/1965 | Huber et al. | 260—239.3 |

HENRY R. JILES, Primary Examiner

R. T. BOND, Assistant Examiner

U.S. Cl. X.R.

252—432 R